United States Patent Office 3,197,987
Patented Aug. 3, 1965

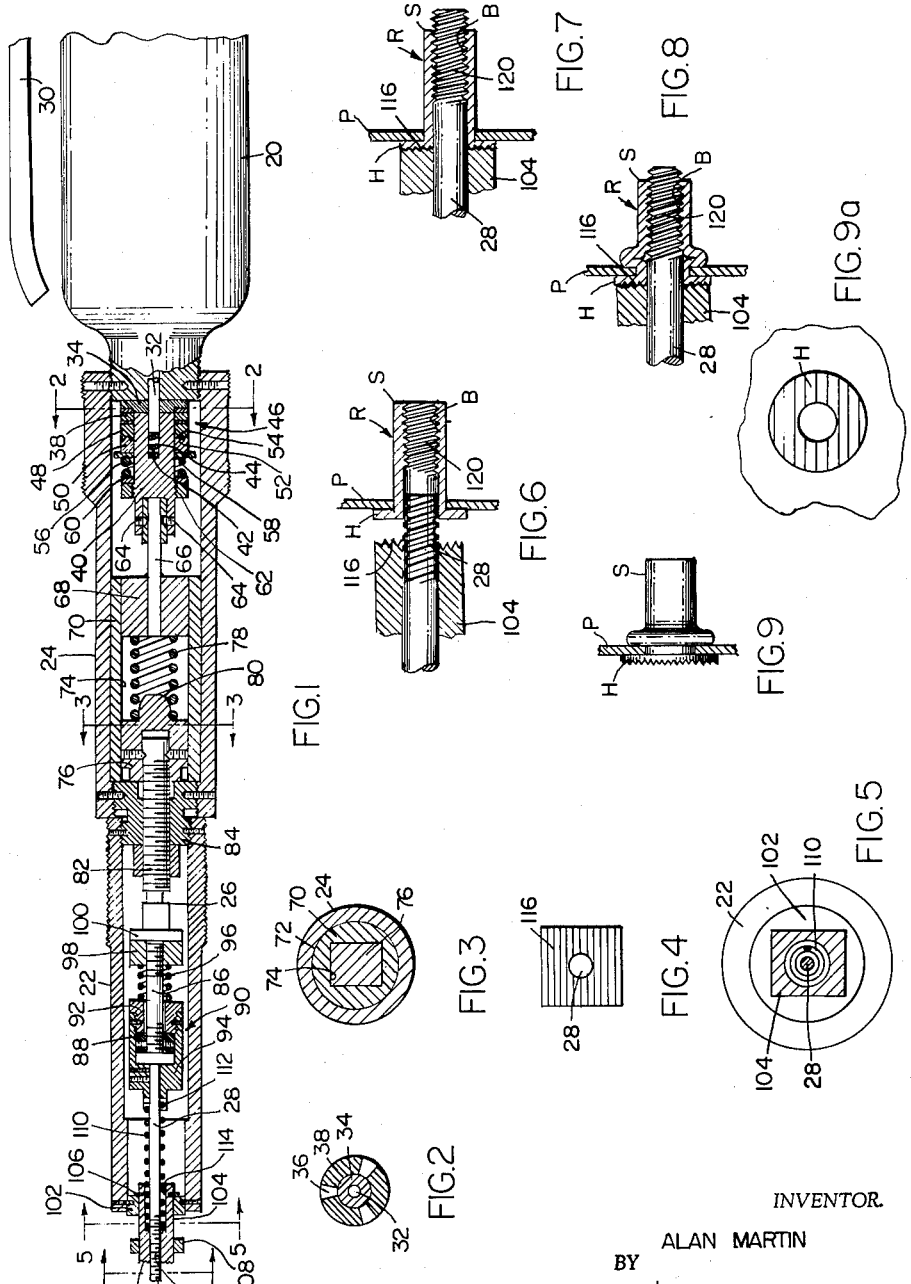

3,197,987
RIVET TOOL
Alan Martin, 21 Grant Circle, Sharon, Mass.
Filed Jan. 11, 1963, Ser. No. 250,935
9 Claims. (Cl. 72—114)

This invention relates to portable rivet setting tools and in one aspect comprises an improvement over the tool disclosed in my earlier Patent Number 3,008,598 issued Nov. 14, 1961 and entitled "Rivet Nut Tool."

Mandrel and screw-type rivets made of aluminum are finding an ever increasing number of uses. Typically, screw type rivets, often called rivet nuts, are now used extensively in the chassis electronic components for attaching circuit boards and may other parts, and mandrel-type rivets, often called pop rivets, are regularly used as fasteners for holding all varieties of light plate stock together.

One important object of this invention is to provide a portable tool powered either electrically or pneumatically, which may be used in the field to set rivet nuts and pop rivets.

Another important object of this invention is to provide a power tool for setting rivets which is relatively lightweight and easy to handle.

Yet another important object of this invention is to provide a rivet setting power tool which engages, sets and subsequently releases the rivet without any force required of the operator other than the actuation of the control switch.

A more specific object of this invention is to provide a power tool for setting rivet nuts which may be a simple adjustment be altered to change the size of the crimp introduced to the rivets set by it.

Another important object of this invention is to provide a rivet setting power tool which sets the rivets with the axes of the revet stems normal to the rivet heads.

Another important object of this invention is to provide a rivet setting hand tool which can specially shape the rivet head as it sets the rivet.

To accomplish these and other objects the tool of this invention includes a screw shaft driven through a clutch by either an electrical or a pneumatic motor and which when turned in one direction engages and sets the rivet and when turned in the other direction disengages the rivet and discharges the part, if any, which it has removed from the remainder of the rivet during the setting operation.

These and other objects and features of this invention along with its incident advantages will be better understood and appreciated from the following detailed description of several embodiments thereof, selected for purposes of illustration and shown in the accompanying drawing, in which:

FIG. 1 is a cross-sectional view of a power driven tool for setting rivet nuts, constructed in accordance with this invention;

FIGS. 2 and 5 are cross-sectional views taken along the corresponding section lines in FIG. 1;

FIGS. 6 to 9 illustrate the successive stages of the rivet setting operation performed by the tool shown in FIGS. 1 to 5;

FIG. 9a is a front view of the rivet shown in FIG. 9;

FIG. 10 is a fragmentary cross-sectional view of a tool for setting pop rivets, constructed in accordance with this invention;

FIGS. 11 and 12 are cross-sectional views taken along the corresponding section lines in FIG. 10;

FIGS. 13 to 15 illustrate the successive stages of the pop rivet setting operation performed by the tool shown in FIGS. 10 to 12;

FIG. 16 is a cross-sectional view similar to FIG. 10 showing another tool for setting pop rivets, constructed in accordance with this invention; and FIG. 17 is a cross-sectional view taken along the corresponding section line in FIG. 16.

Figure 3:
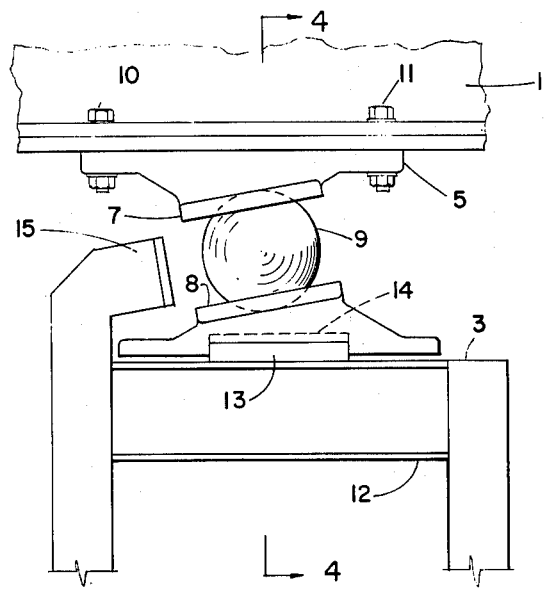
Figure 4:
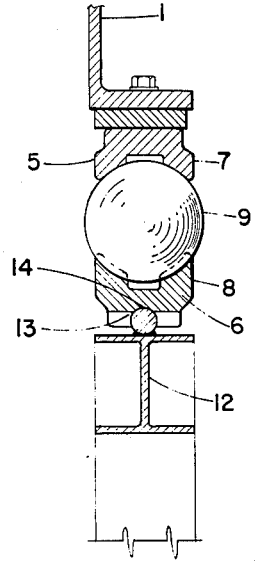
Figure 2:
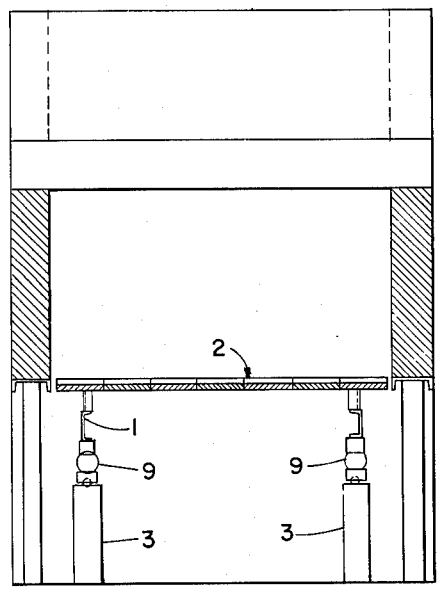

The embodiment of this invention shown in FIG. 1 includes a motor 20, a housing composed of two coaxial sections 22 and 24, a main screw shaft 26 and a secondary shaft 28. The motor 20 shown is electrically operated and has a grip-type of switch actuator 30. The motor may be any one of many different varieties but preferably when the switch 30 is actuated initially the motor is turned on and its shaft 32 rotates in one direction, and upon a second actuation of the switch 30 the motor reverses so that the motor shaft 32 rotates in the opposite direction, and upon a third actuation of the switch 30 the motor stops.

The motor shaft 32 has fixed thereto a drive ring 34 which carries several radially oriented teeth which are adapted to mate with the teeth 36 of a driven ring 38 rotatably mounted on a spindle 40. The spindle 40 has a central bore 42 which receives the motor shaft 32 and contains a spring 44 which urges the shaft 32 out of the bore. Thus, for the blades 36 of the driven ring 38 to engage the blades of the drive ring 34, the spring 44 must be overcome.

The spindle 40 also carries a clutch assembly 46 hereinafter referred to as the motor clutch or rear clutch. The motor clutch includes a pair of clutch plates 48 and 50 having mating faces 52 and 54 respectively which may slip relative to one another when the load applied to the plates in opposite directions exceeds a selected value. The plate 48 is rigidly connected to the driven ring 38 and the two rotate together when the ring 38 in turn is in driving engagement with the drive ring 34. Spring 56 which surrounds the spindle 40 bears against the forward end of the plate 50 of the motor clutch 46 to maintain the faces 52 and 54 of the plates in driving engagement. However, the spring 56 may be overcome as suggested above when the opposing forces on the plates 48 and 50 exceed a selected value causing the faces to slip relative to one another. The ends of spring 56 actually engage the washers 58 and 60 which in turn bear against the clutch plate 50 and adjustment screw 62 respectively. Thus, when the clutch faces 52 and 54 are in engagement with one another the splinde 40 is driven by shaft 32 through drive ring 34, driven ring 38 and the motor clutch 46 whose forwarded plate 50 is fixed to the spindle. While the clutch plate 50 is fixed to the spindle, the driven plate 38 and the rear clutch plate 48 are rotatable with respect to it.

The spindle 40 is connected by a pair of keys 64 to a short shaft 66 in turn braised in a collar 68 rotatably anchored in a sleeve 70. As is evident in FIG. 3, the sleeve 70 has a cylindrical outer surface 72 so that it may rotate freely within the housing section 24, and the sleeve 70 has a rectangular central bore 74. As the bore 74 is rectangular as are collar 68 and sliding collar 76, rotation of the short shaft 66 rotates the rear collar 68, the sleeve 70 and the sliding collar 76. While the collar 76 rotates with the sleeve 74, it may move axially in the sleeve 74 under the influence of the main screw shaft 26 which will be more fully described below.

A main spring 78 disposed within the sleeve 70 surrounds a boss 80 formed on the rear surface of the sliding collar 76 and bears against the rear collar 68. The spring 78 overcomes the bias of spring 44 and maintains the rings 34 and 38 in face to face relationship with their radially oriented teeth in engagement with one another. In the absence of the main spring 78, the spring 44 could urge the spindle 40 forward in the housing section 24 to separate the teeth of the drive and driven rings 34 and 38, respectively. If the plates 34 and 38 were permanently locked together, the main spring 78 could be eliminated.

The sliding collar 76 is permanently keyed to the main screw shaft 26 so that the two move rotationally and axially togeher. The rear portion 82 of the screw shaft 26 bears left hand threads and is screwed into the internally threaded fitting 84 which is in turn threaded into the forward portion of the housing section 24 and the rearward end of the forward housing section 22. The fitting 84 is shown in FIG. 1 to be keyed to the two sections of the housing so that the three parts effectively perform as a single unit. The other end of housing section 24 is threaded onto the motor housing. Because of the threaded engagement of the rear section 82 of the screw shaft and the fitting 84, rotation of the shaft causes the shaft to move axially in a forward or rearward direction depending upon the direction of rotation and the nature of the threads.

The forward portion 86 of the screw shaft 26 carries one plate 88 of rotational friction clutch assembly 90. The other plate 92 of the assembly 90 is in the form of a nipple threaded into sleeve 94 which surrounds the plate 88 and extends forwardly of it. The forward end of the sleeve 94 in turn supports the secondary screw shaft 28. The shaft 28 is shown keyed to the sleeve 94, and the sleeve is also shown keyed to the nipple 92 which frictionally engages the forward plate 88 of the clutch assembly 90. A spring 96 surrounding the forward section 86 of the screw shaft 26 bears against a bearing 98 and collar 100 at its rear end and bears at its forward end against the nipple 92 to yieldably urge the nipple 92 in firm engagement with the plate 88 of the clutch assembly. Thus, the spring 96 serves to yieldably urge the clutch assembly into its driving position wherein no relative rotation occurs between the nipple 92 and the clutch plate 88.

Slidably mounted in a neck 102 keyed in the forward end of the housing section 22 is an anvil 104. A snap ring 106 is seated in a recess formed adjacent the rear of the anvil and prevents the anvil from falling out of the housing section 22, while a stop collar 108 is braized onto the forward end of the anvil to prevent the anvil from falling through the throat 102 and into the housing section 22. A spring 110 surrounds the secondary screw shaft 28 and lies against the bearings 112 at the forward end of the sleeve 94, and the forward end of the spring 110 is positioned in a bore 114 to urge the anvil to the position shown in FIG. 1. The spring 110 may readily be overcome with a load applied to the anvil face 116. Thus the anvil may be moved from the position shown in FIG. 1 to a second position wherein the stop 108 bears against the forward face of the throat or neck 102. The secondary screw shaft 28 extends through the central portion of the bore 114 and through a second axial opening 118 in the anvil so that its end 120 is exposed beyond the face 116 of the anvil.

In FIG. 5 it will be noted that the anvil 104 is rectangular in cross section as is the opening in the neck 102. Therefore, the anvil cannot spin in the neck 102 but rather can only move axially in it between the extreme positions described.

Having described in detail, the several parts of the tools shown in FIGS. 1–5 the manner in which it functions to set the rivet as illustrated in FIGS. 6–9 will now be described. In FIG. 6 a rivet nut R having a stem S and head H is shown extending through an opening in plate P on which the nut is to be permanently affixed. The operator holds the tool so that the end 120 of the secondary screw shaft 28 extends into the central bore B of the rivet nut. The anvil face 116 is shown spaced from the head H of the rivet nut. Little or no force need be applied against the tool toward the rivet nut but rather it is only necessary for the operator to hold the end 120 of the screw shaft 28 inside the bore B.

It will also be noted in FIG. 6 that a substantial portion of the bore B extending from the head H is not threaded but rather the threads are confined to approximately half the length of the rivet nut at the stem end. Thus, the end 120 of the screw shaft can be inserted an appreciable distance into the rivet nut bore B. With the shaft 128 inserted as shown in FIG. 6 and the several parts of the tool in the position shown in FIG. 1, the operator actuates the grip switch 30 which starts the motor 20 rotating in a direction causing the main shaft 26 and its affiliated parts to move rearwardly toward the motor 20; namely, away from the rivet nut R. However, because the threads on the secondary screw shaft 28 are oppositely directed with respect to the threads on the rear section 82 of the main screw shaft 26, while the shaft assembly moves rearwardly in the housing the threads on the forward section 120 of the secondary screw shaft are turning in a direction such that they screw into the threads in the bore B of the rivet nut in the manner disclosed in my earlier patent, supra. Thus, effectively the shaft assembly moves in the direction of the rivet nut R but the housing and the entire tool with the exception of the shaft moves toward the rivet nut R at a greater speed so that the shaft is drawn into the housing. This operation continues until the face 116 of the anvil bears against the head H of the rivet nut, the spring 110 compresses, and the lead end 120 of the screw shaft 128 screws fully into the threaded section of the bore. This condition is shown in FIG. 7. It will be appreciated that as the foregoing occurs, the sliding collar 76 moves to the right as viewed in FIG. 1 in the sleeve 76 toward collar 68. When the condition shown in FIG. 7 is reached, the face 116 of the anvil bearing against the head H of the rivet nut prevents the rivet nut from rotating and as the screw shaft 28 cannot readily screw farther into the rivet nut a substantial load is applied to the screw shaft 28 against its continued rotation. This load causes the clutch assembly 90 to slip; that is, the nipple 92 fixed with respect to the shaft 28 stops rotating while the clutch plate 88 fixed on the forward portion 86 of the main screw shaft 26 continues to rotate with the screw shaft 26. Continued rotation of the motor 20 and the main screw shaft 26 applies a pull on the rivet causing it to crimp or set in a manner shown in FIG. 8. The crimping or setting of the rivet R continues with rotation of the motor until the motor clutch assembly 46 slips due to the load applied to it by virtue of the resistance to further rearward movement of the rivet with the shaft. It will be appreciated that the load is applied by the rivet to the shaft through the threads in the bore B of the rivet stem S. This additional load applied to the assembly causes the motor clutch 46 to slip and the screw shaft 26 is disconnected from the motor shaft 32.

The amount of load required for the clutch assembly 46 to slip may be varied by turning the adjusting nut 62 on the spindle 40. By moving the nut 62 closer to the motor clutch assembly 46, the load applied by the spring 56 upon the clutch plates causing them to bear against one another is increased, and a greater load is necessary to cause the two clutch plates to slip relative to one another. By relaxing the load applied by the spring 56 a lesser force is required to cause clutch slippage. Thus, if a deep crimp is required the load applied by the spring 56 is increased and conversely when a shallow crimp is required the load applied by the spring 56 is relaxed by turning the nut 62 away from the motor clutch assembly.

With the rivet set as shown in FIG. 8 the operator actuates the grip 30 a second time which reverses the direction of rotation of the motor shaft 32 and all of the parts connected to it. Thus, the short shaft 66, sleeve 70, main screw shaft 26, and secondary screw shaft 28 rotate in the opposite direction, and the load on the motor clutch 46 is relaxed causing it to re-engage and the threads on the forward end 120 of the secondary screw shaft 28 unscrew from the rivet nut which is then left as shown in FIG. 9. So mounted, the rivet nut R is in a condition to receive a screw which will in turn support any desired article on the plate. That part may either be spaced from the plate by mounting it on the side stem S of the rivet or alternately may be mounted substantially flush on the plate on the side of the rivet head H.

From the foregoing it will be appreciated that continued rotation of the shaft assembly in one direction causes the leading end 120 of the shaft 28 to take up the rivet nut R and crimp it, and only after the crimping operation is completed is the direction of rotation reversed to unscrew the leading end 120 of the shaft from the crimped rivet. This action basic to my earlier patent, supra is here utilized in a more sophisticated machine having many advantages over the manual machine described in that patent. The clutch assembly 90 eliminates any tendency of the rivet nut to bend or twist as it is being set and reduces the load applied to the threads in the rivet nut bore B during the setting operation. By virtue of the clutch assembly 90 the shaft 28 rotates only so long as the rivet nut is actually being taken up by the leading end 120 of that shaft. When the rivet nut is entirely threaded onto the shaft 28 further rotation of that shaft stops and the load thereafter applied to the rivet is only in axial direction. The motor clutch 46 provides means for regulating the amount of crimping introduced into the rivet, and the noise which it makes by the slipping of its clutch faces 52 and 54 constitute an alarm for the operator indicating he should reverse the direction of rotation of the motor as the crimping operation has been completed.

In FIGS. 1, 4 and 6 to 8 the face 116 of the anvil is shown to be serrated and the configuration illustrated will apply to the head H of the rivet nut similar serrations as shown in FIGS. 9 and 9a. The serrations in the head H of the rivet may serve as a lock washer to prevent rotation of the article later connected by a screw in the threaded stem of the rivet. It will also be appreciated that the anvil face 116 can take other shapes which could serve to countersink the face or head H of the rivet or provide it with other configurations. This is achieved without an additional step and as an inherent function of the anvil 104 because of the character of its face 116 and the manner in which it is squeezed against the head H.

The embodiment of this invention shown in FIGS. 10–12 is capable of setting a pop rivet in a manner shown in FIGS. 13–15. Only that portion of the pop rivet setting tool is shown in FIGS. 10 and 12, which is different from the tool shown in FIGS. 1–5. Thus, the main screw shaft 26 in FIGS. 10 and 11 is identical to the like-numbered shaft shown in FIG. 1 and all parts between that shaft and the motor 20 may be identical to the assembly of FIG. 1. As the forward end of the tool is somewhat different it is shown in detail.

The forward end of the main screw shaft 26 is disposed in a housing section 130 having a rectangular bore 132. Disposed in the section 130 for sliding movement in the bore is a carriage 134. The carriage 134 has a rear plate 136 having a threaded opening 138 which screws onto the threaded portion 140 of the screw shaft 26. The portion 140 of the shaft 26 is threaded in a direction opposite to the section 82 which causes the carriage to move axially in the same direction as the screw shaft itself when the screw shaft 26 is rotated. Thus, when the screw shaft 26 is rotated so that its threaded section 82 causes the screw shaft to move rearwardly towards the motor, the carriage 134 moves at a greater speed in the same direction as it is taken up by the threads 140.

Within the carriage 134 is a block 142 which bears against the forward end 144 of the section 140 of the screw shaft. The block 142 is biased against the end 144 of the shaft by spring 146, and the spring 146 bears against the rear faces of a pair of jaws 148 and 150 also mounted on and slidable relative to the carriage 134. Each of the jaws 148 and 150 has an inclined face 152 which mates with one of the inclined faces 154 forming part of the front wall 156 of the carriage.

It will be noted in FIGS. 10 and 11 that the front wall 156 includes a central section 158 of uniform thickness and end sections 160 which define the inclined faces 154. The jaws 148 and 150 are urged apart by a second spring 162 of bearing against their gripping faces 164. The spring 162 thus urges the gripping faces 164 of the jaws 148 and 150 apart by urging the inclined walls 152 of the jaws to slide rearwardly on the mating inclined walls 154.

The forward end of the housing section 130 is closed by a fitting 166 having an anvil head 168. An opening 170 extends through the anvil head and fitting and is aligned with an opening 172 in the forward wall 156 of the carriage 134.

In FIG. 13 the pop rivet PR set by the tool of FIGS. 10–12 is shown extending through two plates to be locked together. Extending through the pop rivet is its mandrel M with the mandrel head M' exposed beyond the stem PR' of the pop rivet. The mandrel extends through the entire length of the pop rivet stem, through the fitting 166 of the tool and through the opening 172 in the front wall 156 of the carriage. The end of the mandrel is shown in FIG. 14 to be gripped between the jaws 148 and 150. The condition shown in FIG. 14 is achieved by placing the mandrel 168 of the fitting 166 against the head of the pop rivet so that the mandrel extends through the openings 170 and 172 in the tool and between the gripping faces 154 of the jaws 148 and 150 as shown in FIG. 13. The operator then actuates the motor switch which causes the carriage to move rearwardly in the housing 130 so that the jaws effectievly move forwardly and bind against the mandrel stem. Continued rotation of the motor turns the screw shaft 26 which causes the head M' of the mandrel to enter the stem PR' of the pop rivet as a very strong pull is exerted upon the mandrel by the jaws which bind upon it. In FIG. 14 it will be noted that the carriage 134 is shown spaced from the fitting 166 and the jaws 148 and 150 are shown to be tightly bound upon the mandrel stem. Continued rearward pull exerted by the tool on the mandrel ultimately causes the mandrel to break, and the location of the break can be controlled by providing the mandrel with a portion of reduced cross-section as suggested in FIGS. 13 and 14. Provided with a portion of reduced cross-section the mandrel will break at that particular location. In FIG. 15 the mandrel is shown wedged tightly into the stem of the rivet, and the end of the stem is flared by the mandrel head M'. Ordinarily the portion of the mandrel which breaks off in the stem of the pop rivet remains as a permanent part thereof.

After the setting of the pop rivet is completed by the sequence of steps suggested in FIGS. 13–15 the operator again actuates the motor switch to reverse the direction of its rotation. This causes the parts to move in the opposite direction and relieves the force applied to the jaws through the block 142 and the intermediate spring 146. As a result the jaws are allowed to move apart and release the portion of the mandrel M which remains between them. Thus it is seen that by the same sequence of steps followed in the operation of the tool shown in FIG. 1, the pop rivet is set and the mandrel is subsequently released by the jaws.

In FIGS. 16 and 17 yet another embodiment of the tool for setting pop rivets is shown. In that embodiment the housing 130, the fitting 166 and the screw shaft 26 are identical to the embodiment of FIGS. 10 to 12. However, the carriage 180 is somewhat different from the carriage 134 of the previous embodiment as the front wall 182 is different from the corresponding wall of the carriage 134. The rear wall 184 of the carriage is provided with a threaded bore 186 which causes the carriage 182 to move in the same direction as the shaft 26 when the shaft is rotated, but at a somewhat greater speed. The forward wall 182 of the carriage has an inclined face 188 and an enlarged opening 190 which cooperate with a gripping block 192 movable in the carriage and actuated by the forward end 144 of the screw shaft 26. The inclined face 188 of the front wall 182 causes the gripping block 192 to rise slightly within the housing 130 when its forward inclined wall 194 engages it. An arm 196 extending forwardly from the gripping block 192 enters the opening 190 in the forward wall 182 of the carriage as the gripping block 192 moves in a forward direction with respect to the carriage, and the upward movement of the gripping block causes the arm to approach the upper wall of the opening 190.

In FIG. 17 the slot 190 is shown defined at its top by a downwardly concave wall 198 which is in face to face relationship with an upwardly concave face 200 formed on the arm 196. As a result, when the gripper block 192 moves upwardly on the inclined wall the opposed concave faces move closer to one another and if provided with serrations or otherwise roughened surfaces they will firmly grip the mandrel of a pop rivet inserted through the opening 170 in the fitting 166. It will of course be understood that the relative axial movement of the carriage 134 and the gripper block 192 is the same as that between the jaws 148 and 150 and the carriage 134 of the previously described embodiment. Therefore when a mandrel of a pop rivet is inserted through the opening 170 and the screw shaft 26 is rotated, the arm of the gripper block 192 will cooperate with the upper wall 198 of the slot 190 to firmly engage the mandrel, and continued rotation of the screw shaft will cause the mandrel to snap just as is illustrated in FIGS. 13-15. Thereafter, by reversing the rotation of the motor shaft the portion of the mandrel gripper between the concaved faces will be released.

From the foregoing description it will be appreciated that the power tools described in the foregoing specification are capable of performing all of the objects set forth in the introduction. Moreover, the tool is capable of being operated either by an electric or pneumatic motor, and the power requirements are relatively small in consideration of the work performed by the tool. Because numerous modifications of the present invention will occur to those skilled in the art, it is not intended that the breadth of this invention be limited to the specific embodiments illustrated and described herein. Rather, it is intended that the scope of this invention be determined by the appended claims and their equivalents.

What is claimed is:

1. A rivet nut tool comprising,
    a case,
    a shaft assembly extending axially through the case,
    a threaded collar secured to the case and registering with a threaded section on the shaft assembly causing the shaft assembly to move axially in the case in response to rotation thereof,
    an anvil carried on one end of the case and having an opening therein coaxial with the case and the shaft assembly, said shaft assembly extending through the opening and being threaded in a direction opposite to the threads on the section registering with the collar,
    a friction clutch disposed between and connecting the two threaded sections of the shaft assembly enabling the shaft assembly end extending through the anvil to move rotationally relative to the remaining portion of the shaft assembly,
    a power source connected through a second clutch to the opposite end of the shaft assembly enabling the power source to operate without turning the shaft assembly when the load on the assembly exceeds a predetermined value,
    and means for switching the direction of rotation of the power source.

2. A rivet nut tool as defined in claim 1 further characterized by said anvil being nonrotatable and axially movable on the end of the case,
    and biasing means yieldably urging the anvil outwardly of the case in the direction of a rivet into which the shaft assembly is threaded.

3. A rivet nut tool comprising,
    a case,
    a shaft extending axially through the case,
    a power source for rotating the shaft,
    means carried by the case causing the shaft to move axially in the case in response to its rotation by the power source,
    a second shaft connected through a clutch assembly to the first-recited shaft and axially fixed to it so that they move axially together in response to operation of the power source, said clutch assembly enabling the second shaft to slip rotationally with respect to the first-recited shaft so that the first-recited shaft can rotate without rotating the second shaft,
    and threads formed on the end of the second shaft which extend beyond the end of the case and adapted to screw into a rivet nut when the second shaft is rotated so that it moves axially away from the rivet nut.

4. A rivet nut tool as defined in claim 3 further characterized by
    an anvil surrounding the end of the second shaft extending beyond the case and adapted to engage the head of the rivet nut when the threads formed on the end of the second shaft screw into the rivet nut and applying an axially directed force against the rivet nut and away from the case which opens the clutch when the second shaft is threaded fully into the rivet nut.

5. A rivet nut tool as defined in claim 4 further characterized by
    said anvil being moveable axially on the shaft and nonrotatable with respect to the case and being biased in a direction outwardly toward the rivet nut into which the second shaft is screwed.

6. A rivet nut tool as defined in claim 4 further characterized by
    a second clutch between the motor and the first-recited shaft limiting the axial pull which may be exerted by the shaft on the rivet through rotation of the power source.

7. A rivet nut tool as defined in claim 6 further characterized by
    means connected to the power source for reversing its direction of rotation and causing the second shaft to unscrew from the rivet nut.

8. A rivet setting tool comprising
    a housing,
    a shaft extending through a portion of the housing,
    a power source connected to the housing for rotating the shaft in either direction in the housing,
    means connected to the housing causing the shaft to move axially into the housing when the power source rotates the shaft in one direction,
    a pair of jaws moveable axially in the housing in the same direction as the shaft in response to axial movement of the shaft for gripping a mandrel of a pop rivet and pulling it in the direction of the shaft,
    and clutch means disposed between the power source and the shaft limiting the axial pull which can be exerted on the rivet by the jaws to set it resulting from rotation of the shaft, said clutch means disconnecting the shaft from the power source when the pull exceeds some selected value.

9. A rivet setting tool as defined in claim 8 and further characterized by
    a carriage movable in the housing and connected to the shaft and moving axially in the same direction as the shaft, said jaws being disposed in the carriage and movable relative thereto, means forming part of the carriage and operatively connected to the jaws causing them to assume a gripping condition when the carriage moves in a direction away from a rivet engaged by the tool, and means causing the jaws to assume a nongripping condition when the carriage moves in the opposite direction.

References Cited by the Examiner
UNITED STATES PATENTS

| 625,751 | 5/99 | Foote | 218—19 |
| 1,164,903 | 12/15 | Ackerman et al. | 218—19 |
| 2,423,956 | 7/47 | Amtsberg | 218—45 |
| 3,008,598 | 11/61 | Martin | 218—43 |
| 3,029,665 | 4/62 | Baugh et al. | 218—42 |

GRANVILLE Y. CUSTER, JR., *Primary Examiner.*